United States Patent [19]

Hasebe et al.

[11] Patent Number: 5,389,351
[45] Date of Patent: Feb. 14, 1995

[54] METHOD FOR DESULFURIZING A GAS

[76] Inventors: Nobuyasu Hasebe; Nobukatsu Hasebe, both of 30351 Camino Porvenir, Rancho Palos Verdes, Calif. 90274

[21] Appl. No.: 970,695

[22] Filed: Nov. 4, 1992

[51] Int. Cl.$^6$ .................. C01B 17/04; C01B 17/16
[52] U.S. Cl. .................. 423/242.1; 423/244.09; 423/220; 423/222; 423/574.2; 423/575; 423/230
[58] Field of Search ............ 423/576.7, 576, 575, 423/574 R, 244.09, 243.06, 243.01, 226, 222, 220, 574.1, 574.2, 242.1, 230

[56] References Cited

U.S. PATENT DOCUMENTS

| | | | |
|---|---|---|---|
| 3,598,529 | 8/1971 | Deschamps | 23/225 R |
| 3,649,190 | 3/1972 | Deschamps | 23/193 |
| 3,880,986 | 4/1975 | Beavon | 423/574 |
| 3,937,795 | 2/1976 | Hasebe | 423/573 G |
| 3,947,559 | 3/1976 | Gibson et al. | 423/515 |
| 4,442,083 | 4/1984 | Canales et al. | 423/567 R |
| 4,976,935 | 12/1990 | Lynn | 423/222 |
| 5,120,517 | 6/1992 | Elshout | 423/239 |

*Primary Examiner*—Gary P. Straub
*Assistant Examiner*—Timothy C. Vanoy
*Attorney, Agent, or Firm*—John E. Vanderburgh

[57] ABSTRACT

A foul gas containing $H_2S$ is brought into the presence of $SO_2$ in a first stage to permit the reaction between $SO_2$ and $H_2S$ to form water and elemental sulfur. The $SO_2$ is solubilized in an absorbent composition which includes a solvent for both $SO_2$ and $H_2S$ so that the $H_2S$ in the foul gas is first solubilized in the absorbent composition where it is then brought into contact with the solubilized $SO_2$ for reaction between a major portion of the $H_2S$ and the solubilized $SO_2$ to form elemental sulfur. The gas is then passed to a second stage where any remaining $H_2S$ is removed by aqueous catalytic reaction of the type conventional in the prior art. The apparatus utilized to carry out the present invention preferably includes a two stage column in which the first stage provides the absorbent material containing solubilized $SO_2$ for reaction with the $H_2S$ of the foul gas. During the $SO_2$ extraction stage the major portion of the $H_2S$ is removed from the foul gas. The gas is then conveyed from the first stage to a second stage which comprises a conventional aqueous catalytic scrubbing operation where the remainder of the $H_2S$ is removed. The absorbent composition utilized in the process comprises solvents that dissolve $SO_2$ and/or $H_2S$ which can be heated to a temperature above the melting point of sulfur without detrimentally affecting the solvent so that it may be recycled through the system.

17 Claims, 3 Drawing Sheets

METHOD FOR DESULFURIZING A GAS

This invention relates to the treatment of gases and more particularly to method and apparatus for desulfurizing flue gases and the like.

BACKGROUND OF THE INVENTION

Gases which contain sulfurous products such as sulfur oxide and hydrogen sulfide, flue gas or foul gas, pose a major environmental problem in that the sulfur containing compounds can form acid rain under proper atmospheric conditions and therefore must be removed from the gases before they can be discharged into the atmosphere. Such gases are produced by the combustion of various fuels and as waste gases from petroleum cracking processes and the like. Substantial research has been conducted in the so-called wet sulfurization technology which is attempting to develop processes suitable for the treatment of large volumes of foul gases and gases which contain high concentrations of sulfur oxides and hydrogen sulfide. Thus sulfur oxides are removed from flue gases and the like by contacting the sulfur oxide containing gas with a water solution of sodium sulfite to produce acid sodium sulfite. The acid sodium sulfite is then treated with calcium carbonate or calcium hydroxide to generate calcium sulfite crystals which are subsequently oxidized to gypsum. A similar method involves a slurry of calcium hydroxide which is then contacted with the flue gas to produce calcium sulfite which is subsequently oxidized to gypsum. In yet another method flue gas is contacted with an aqueous slurry of magnesium oxide to form magnesium sulfite which may then be thermally decomposed to regenerate $SO_2$ and $MgO$.

Gases containing hydrogen sulfide may be subjected to the well known amine absorption or Klaus process. Another process for the treatment for gases containing $H_2S$ is the Hiperion process, for example as described in U.S. Pat. Nos. 3,459,495, 3,937,795 and 4,255,400, is a single step liquid redox hydrogen sulfide removal process that uses a naphthoquinone chelate catalyst. Another process for the treatment of gas to remove $SO_2$ is referred to as the Takahax process and is defined in U.S. Pat. No. 3,459,495. Hydrogen sulfide may also be extracted from a gas stream by absorption in an aqueous solution of a catalytic reagent containing vanadium compound or an iron chelate.

The sulfur oxide removal processes, although effective for the removal of sulfur oxides from a gas, present substantial reaction product disposal problems as well as exhibiting low efficiency which require the use of high quantities of reactants. The processes for $H_2S$ removal also involve the use of substantial quantities of the catalyst for converting $H_2S$ to elemental sulfur. The elemental sulfur recovered from aqueous catalytic processes contains a sufficient amount of catalyst material to reduce the commercial value of the sulfur thus produced.

The elemental sulfur produced in the foregoing processes for stripping $H_2S$ can be recovered and purified by heating to a temperature above the melting point of the sulfur but below the boiling point of the catalyst or stripping solvent, or by maintaining a stripping solvent at a relatively high temperature and subsequently cooling the stripping solvent to cause the precipitation of the sulfur therefrom.

In U.S. Pat. No. 5,049,370 there is described an environmentally benign system for recovering elemental sulfur from an aqueous cake by contacting the cake with an organic solvent at an elevated temperature and permitting the mixture to separate into an organic phase in which the sulfur is solubilized while leaving the catalyst residue in the aqueous phase. A number of electrophilic solvents are disclosed as being suitable for solubilizing substantial quantities of sulfur including such water immiscible solvents as xylene, ethyl benzene, tetra hydronaphthalene, petroleum naphtha, trichloroethylene, carbon tetrachloride and the like. Other electrophilic compounds include amines, alcohols, glycols, aromatic hydrocarbons which may be used alone or in combination with a base solvent which is water immiscible.

As mentioned above, however, the processes for stripping $H_2S$ require substantial quantities of catalyst which imposes an economic burden of substantial magnitude on the process. The table illustrates the catalyst consumption in tons per month for typical high volume $H_2S$ stripping processes over various types of foul gas.

TABLE A

| TYPE OF FOUL GAS | GAS VOLUME $Nm^3/hr$ | $H_2S$ CONTENT | CATALYST USE as napthaquinone t/month | |
|---|---|---|---|---|
| | | | Takahax Process | Hiperion Process |
| Coke Oven Gas | 100,000 | 10 $g/m^2$ | 5.36 | 3.22 |
| Petroleum Cracked Gas | 100,000 | 13% | 105.85 | 63.50 |
| Petroleum Hydrogenation Gas | 100,000 | 99% | 80.61 | 48.36 |
| Methanol Fermentation Gas | 150,000 | 3% | 36.39 | 21.98 |

Accordingly, it would be highly desirable to provide a process for the desulfurization of sulfur containing gases which can handle large volumes of gas utilizing a minimum of catalyst material thereby to reduce the economic burden of desulfurizing gases.

SUMMARY OF THE INVENTION

The present invention relates to a method and apparatus for desulfurizing a gas using a minimum of catalyst. The method of the present invention is capable of operating with large volumes of sulfur containing gas with a minimum of expense. The apparatus for carrying out the method of the present invention can operate on a continuous or batch-type basis.

In accordance with the present invention a foul gas containing $H_2S$ is brought into the presence of $SO_2$ in a first stage to permit the reaction between $SO_2$ and $H_2S$ to form water and elemental sulfur. The $SO_2$ is solubilized in an absorbent composition which includes a solvent for both $SO_2$ and $H_2S$ so that the $H_2S$ in the foul gas is first solubilized in the absorbent composition where it is then brought into contact with the solubilized $SO_2$ for reaction between a major portion of the $H_2S$ and the solubilized $SO_2$ to form elemental sulfur. The gas is then passed to a second stage where any remaining $H_2S$ is removed by aqueous catalytic reaction of the type conventional in the prior art.

The absorbent composition containing elemental sulfur is then processed to remove the sulfur and the absorbent composition is recycled for further use.

The apparatus utilized to carry out the present invention preferably includes a two stage column in which the first stage provides the absorbent material containing solubilized $SO_2$ for reaction with the $H_2S$ of the foul gas. During the $SO_2$ extraction stage the major portion of the $H_2S$ is removed from the foul gas. The gas is then conveyed from the first stage to a second stage which comprises a conventional aqueous catalytic scrubbing operation where the remainder of the $H_2S$ is removed.

The absorbent composition from the first stage, which now contains elemental sulfur formed from the reaction between the $SO_2$ and the $H_2S$, is then moved to a separation operation which may comprise heating the absorbent composition above the melting point of sulfur causing the molten sulfur to collect in the bottom of the vessel and drawn out. In another embodiment of the invention the $SO_2$ contact stage is maintained at an elevated temperature below the melting point of sulfur and then is moved to a chiller where the temperature of the absorbent composition is lowered causing the sulfur to precipitate. The resulting precipitate may be removed by centrifugation or other solid/liquid separation procedures.

In one aspect of the invention, a sulfur combustion unit communicates with the $SO_2$ contact stage for oxidizing a portion of the sulfur produced by the process to form $SO_2$ which is then introduced into the absorbent composition in the $SO_2$ stage for solubilization in the absorbent composition.

In another aspect of the invention, ordinary flue gas containing $SO_2$ is introduced into the $SO_2$ contact stage of the apparatus for solubilization of the $SO_2$ in the flue gas.

In yet another aspect of the invention, gas from which the $H_2S$ has been removed but which still contains a significant amount of $SO_2$, for example Claus oven tail gas, may be led back into contact with the absorbent composition for solubilization of the $SO_2$.

In its preferred embodiment where flue gas and/or other $SO_2$ containing gas is utilized for its $SO_2$ content, the contact between the $SO_2$ containing gas and the absorbent composition is carried out in a separate vessel. This is preferred because flue gases and processed gases contain excess oxygen and nitrogen which are inert gases in so far as desulfurization in accordance with this invention is concerned but which may be deleterious if the treated gas is employed in certain downstream processes such as thermal cracking processes. Accordingly, solubilizing $SO_2$ from such gases in a separate container followed by a transfer of the absorbent composition containing dissolved $SO_2$ to the desulfurization unit is carried out to avoid the introduction of excess oxygen and nitrogen into the processing unit where it can be carried out with the treated gas.

Other advantages and features of the present invention will become apparent from the following detailed description of the invention taken in conjunction with the accompanying drawings.

DETAILED DESCRIPTION OF THE INVENTION

Figure 1:
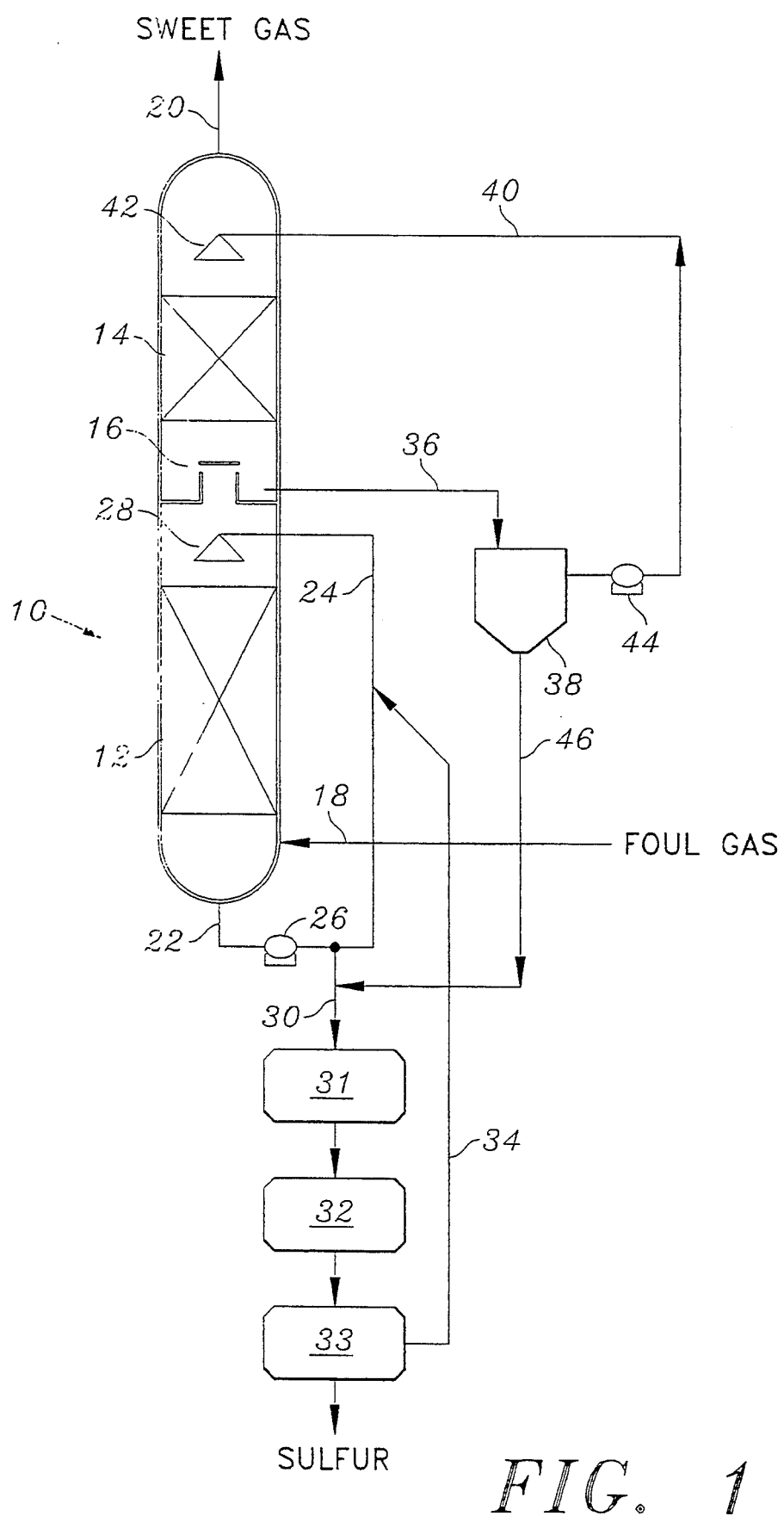
FIG. 1 is a schematic diagram of apparatus for removing hydrogen sulfide from a gas in accordance with the present invention.

As used herein the terms "foul gas" (which shall encompass "flue gas") shall mean a gas which contains a substantial quantity of $H_2S$. Foul gas is derived from a variety of sources; gases generated by coke ovens, gases generated during petroleum cracking processes, gases generated by petroleum hydrogenation processes and fermentation gases. The sulfur containing compounds in such gases, primarily $H_2S$, render the gases noxious and require that the gases be treated to remove the $H_2S$ and other sulfur containing compounds to make them environmentally acceptable prior to discharge into the atmosphere. The term "sweet gas" refers to gases which have been treated to remove the $H_2S$. Such gases, however, may still include substantial quantities of $SO_2$.

Prior art treatment processes for the removal of $H_2S$ from gases generally involve the use of catalytic compounds which convert the $H_2S$ to elemental sulfur. As mentioned above, these processes impose a substantial economic burden on the user because catalyst is lost in the process due primarily to the entrainment of the catalyst with the elemental sulfur formed and the difficulty encountered in separating the sulfur from the catalyst material. The entrained catalyst is thus removed from the processing liquids along with the sulfur and lost from the process. Conventional non-catalytic treatment processes based primarily on the reaction between $H_2S$ and $SO_2$ in an aqueous solution are also unsatisfactory because of the low solubility of $H_2S$ and $SO_2$ in water. The resultant particle size of sulfur obtained from such reactions are colloidal and it is extremely difficult to separate the sulfur particles from the aqueous base.

In the present invention, a major portion of the $H_2S$ is first removed from the gas being treated by contacting the gas with an absorbent composition in which $SO_2$ and $H_2S$ are soluble. The solubilized $SO_2$ and $H_2S$ react in accordance with the following formula:

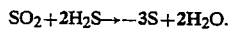

$$SO_2 + 2H_2S \rightarrow 3S + 2H_2O.$$

In the solubilized condition, $SO_2$ and $H_2S$ react to form elemental sulfur which can be readily removed from the absorbent composition by conventional means such as heating the sulfur containing material above the melting point of sulfur and below the boiling point of the absorbent composition. The melted sulfur aggregates into a large mass and separates from the absorbent composition. In the alternative the sulfur can be separated by maintaining the absorbent composition at an elevated temperature at which both $SO_2$ and $H_2S$ are soluble. The sulfur then is separated by cooling the absorbent composition to a temperature at which the elemental sulfur is no longer soluble and is caused to precipitate. The separation process may then be completed by centrifugation or other liquid/solid separation techniques and the absorbent composition is reheated and returned for further processing.

The reaction between $SO_2$ and $H_2S$ solubilized in the absorbent composition results in the removal of a major portion of the $H_2S$, i,e., on the order of 99%, from the gas being treated. The resultant elemental sulfur thus formed is of good quality and is free of catalytic contamination. The minor portion of the $H_2S$ still remaining in the gas is removed in a second scrubbing stage by passing the gas through an aqueous solution containing a catalyst. Any of the known catalytic processes can be employed although I prefer to utilize the catalytic process described in U.S. Pat. Nos. 3,937,795 or 4,225,400 which define processes employing quinone compounds complexed with a metal for converting $H_2S$ to sulfur. Sulfur may be separated from the aqueous catalyst containing solution be filtration or by liquid extraction as described in U S. Pat. No. 5,049,370. Although the final scrubbing stage results in loss of catalytic material, it will be understood that the economic burden is minimal since the final catalytic scrubbing stage deals with one percent or less of the total $H_2S$ content of the gas being treated. Accordingly, the amount of catalyst required is far less than would be required if the gas were being treated totally by the aqueous catalyst solution.

As illustrated in FIG. 1, the apparatus for carrying out the process of the present invention includes a reaction column 10 which is divided into a lower extraction section 12 where a major portion of the $H_2S$ is removed as described above, and an upper scrubber section 14 for final removal of the $H_2S$. The sections are divided by a liquid draw-off tray 16 provided with a chimney 16a and cap 16b for passage of gas from the lower extraction section 12 to the upper scrubber section 14.

The foul gas is introduced into the lower section 12 of the column 10 through a line 18 and the treated "sweet gas" exits at the upper section 14 of the column through a line 20. Absorbent solvent containing solubilized $SO_2$ is disposed in the extraction section 12 and is circulated counter to the flow of the foul gas through an exit line 22 and a return line 24 by means of a pump 26. A spray head 28 is connected to the line 24 at its discharge end in the extraction section 12 to disperse the incoming absorbent composition. As the absorbent solvent becomes saturated with sulfur, portions are taken out of the circulation through a line 30 to a heater 31 for heating absorbent solvent to a temperature above the melting point of sulfur. Following heating the sulfur laden absorbent solvent passes through a cooler 32 where it is cooled to a temperature below the melting point of sulfur (about 30° C.) to precipitate filterable sulfur particles. The cooled absorbent then passed through a filter 33 for separation of the elemental sulfur from the absorbent solvent. The filtered absorbent solvent then is returned to the circulation line 24 through a solvent return line 34 for reuse in the process.

After passing through the extraction section 12, the foul gas passes through the divider into the scrubber section 14 which contains an aqueous solution of a quinone metal chelate for final scrubbing and removal of $H_2S$. A portion of the aqueous chelate containing solution is led by a line 36 to a settler 38 for separation of the elemental sulfur from the aqueous chelate containing solution. The solution is then returned by a line 40 and is dispersed in the scrubber section by a spray head 42. A pump 44 is provided to provide the circulation of the chelate containing aqueous solution. The elemental sulfur which has been separated at the settler 38 may be led by a line 46 to the line 30 for admixture with the absorption solvent containing elemental sulfur from the extraction section 12. In the alternative, sulfur from the settler 38 may be disposed of as it does contain small quantities of the quinone chelate absorbed onto the sulfur particles.

The absorbent composition utilized in the process comprises solvents that dissolve $SO_2$ and/or $H_2S$ which can be heated to a temperature above the melting point of sulfur without detrimentally affecting the solvent so that it may be recycled through the system. Examples of solvents having the desired characteristics are described in U.S. Pat. No. 5,049,370. Such solvents include amines, alcohols, glycols and aromatic hydrocarbons, either alone or combined with other electrophilic or nucleophilic organic compounds which improve the performance of the absorptive composition. For example, ethoxy-, protoxy-, butoxy- alcohol compounds, alcohol-amine compounds such as mono-, di-, and triethanolamine, N,N-dimethylethanolamine, N,N-diethylethanolamine can be used as the absorbent composition in the present invention. Additional solvents include 2,2'-aminodiethanol, N-butyldiethanolamine, N,N-dimethylacetamide, N,N-diethylacetamide, N,N-dimethylformamide, dipropylformamide, N,N-diethylformamide, and carbamic esters. Additional amine compounds include dicyclodihexylamine, dibutylformamide, and sulfones such as tetramethylene sulfone (monothione), 1,2-dithiol-3 thione (dithione), and trithione ($R—C(CS_2)=CS—R'$) compounds. The absorbent composition normally comprises an admixture of these compounds and the mixture is a matter of choice depending on the conditions present such as $H_2S$ concentration, temperature and pressure of the foul gas and the method for separating the sulfur. For example, if the sulfur separation process is to involve heating the absorbent composition to melt the elemental sulfur, the absorbent composition should include high boiling point solvents such as the polysulphones, carbamic esters, cyclohexylamine, di-cyclohexylamine, N,N-dimethylformamide, N,N-diethylformamide, 1,3-propane sulfone, 2-aminoethanol, diethanolamine and N-butyldiethanolamine. Good results have been obtained with a solvent admixture including monothione and pyridine or quinoline.

As illustrated in FIG. 1 the sulfur is separated from the absorbent composition by a simple filtration step, however, it will be understood that simple filtration does not remove all the sulfur from the absorbent composition because the sulfur formed in the absorbent composition is colloidal in nature and is not readily separated by simple filtration. The continued recirculation of the absorbent composition will gradually build up the colloidal sulfur concentration in the absorbent and will eventually result in reduced efficiency or the necessity of recirculating and separating greater quantities of the absorbent composition. Accordingly, it is preferred to apply auxiliary methods to promote the separation of the sulfur. Such means include heating the absorbent composition above the melting point of sulfur causing the sulfur to melt and gradually accumulate as a molten mass which can be readily separated from the absorbent composition.

A preferred method is to maintain the absorbent composition in the extraction section at an elevated temperature to increase its capacity for the elemental sulfur. Subsequently, the absorbent composition is cooled below the solubility point of the sulfur causing it to precipitate. The sulfur can then be separated by conventional liquid/solid separation methods such as filtration or centrifugation.

In the preferred mode of operation the $SO_2$ extraction is carried out with the absorbent heated to a temperature of between about 30° C. to about 60° C. The sulfur thus formed is colloidal. To effect separation of the sulfur a portion of the absorbent is heated to a temperature of above about 110° C. and then cooled to precipitate the sulfur as filterable particles which are readily separated from the absorbent by conventional filtration. Where the extraction is carried out under pressure the temperature of the absorbent may be higher since the boiling point of the absorbent is substantially elevated. At the higher temperature the absorption of the $H_2S$ is improved and the efficiency of the process is increased.

In the embodiment of the invention illustrated in FIG. 1, it is assumed that the foul gas entering the extraction stage 12 of the column 10 contains sufficient $SO_2$ to provide stoichiometric quantities for reaction with $H_2S$ to form elemental sulfur. However, in many cases the foul gas does not incorporate sufficient $SO_2$ content to carry out the reaction. In that event, makeup $SO_2$ must be added to the absorbent composition. An excellent source of makeup $SO_2$ is the elemental sulfur produced by the process. The elemental sulfur is oxidized to sulfur dioxide by subjecting the sulfur to an elevated temperature in the presence of oxygen to oxidize the sulfur to $SO_2$. From the formula for the reaction between $SO_2$ and $H_2S$ set out above it will be seen that three mols of sulfur are produced for each mol of $SO_2$. Accordingly, one third of the sulfur recovered from the process can be oxidized to produce makeup $SO_2$ which is then returned to the absorbent composition and solubilized therein.

Figure 2:
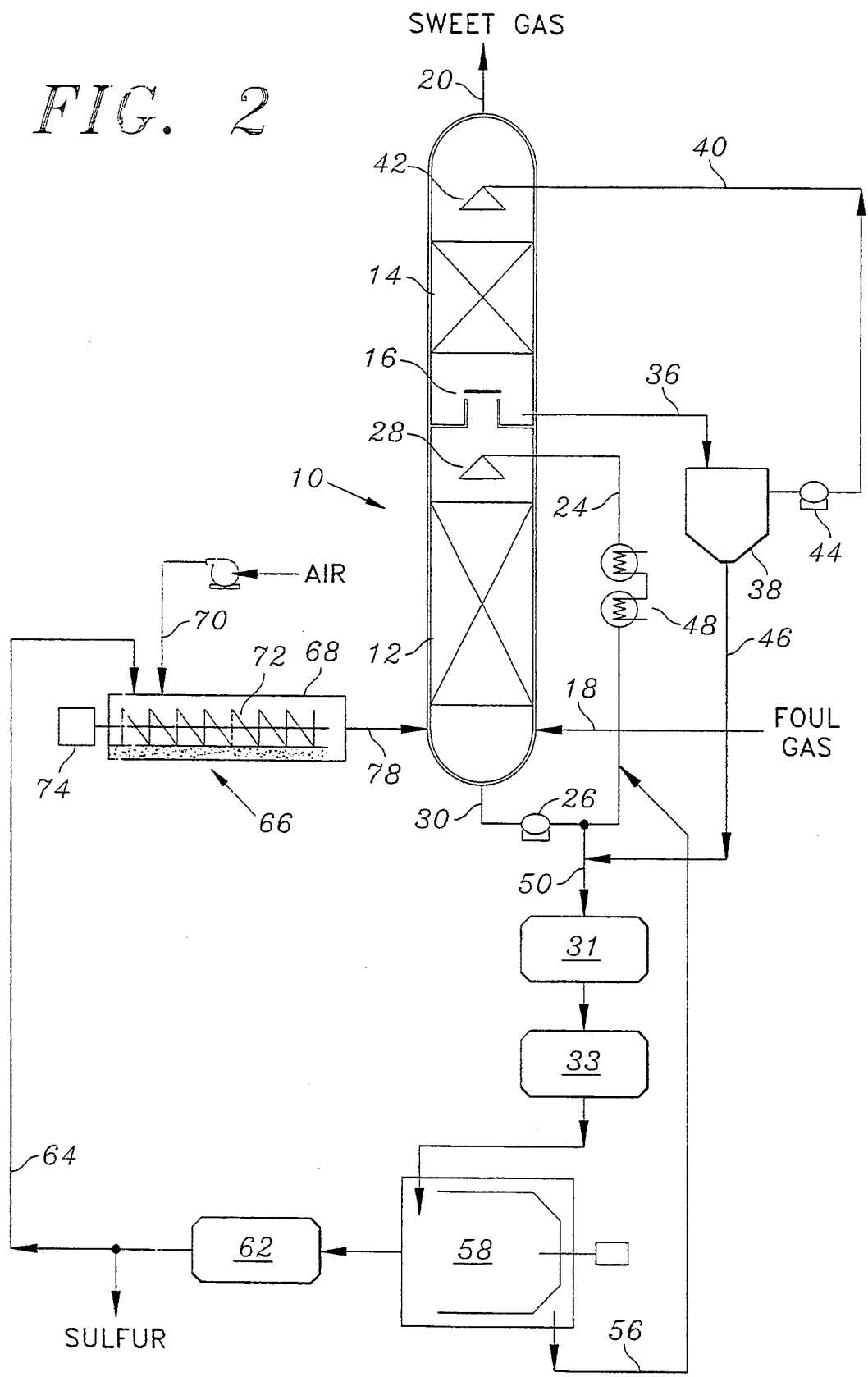
FIG. 2 is a schematic diagram of apparatus employing sulfur combustion as a source of make up sulfur dioxide.

In FIG. 2, in which like reference numbers are applied to like parts, apparatus for removing hydrogen sulfide from a gas includes the column 10 which is divided into the extraction section 12 and the scrubber section 14 as described in connection with FIG. 1. The foul gas is introduced through the line 18 and exits from the column 10 through the line 20. The absorbent composition is maintained in the extraction section 12 for solubilizing sulfur dioxide and hydrogen sulfide which react to form the elemental sulfur. In the embodiment illustrated the absorbent composition is maintained at a temperature of 30° C. and 90° C. by means of heat exchangers 48 which heat up the absorbent composition as it circulates through the lines 30 and 24 back to the extraction section 12. Portions of the absorbent composition are removed from the line 24 and conducted by a line 50 to the heater 31 to raise the temperature of the absorbent composition above 110° C. to melt the colloidal sulfur contained therein. The absorbent then passes through the cooler 33 where the absorbent composition is cooled to a temperature of about 30° C. to initiate precipitation of the elemental sulfur from the absorbent composition. The cooled absorbent composition is then directed to a centrifuge 58 to complete the sulfur separation. The absorbent composition leaving the centrifuge 58 is returned by a line 56 to the line 24 to be recirculated through the process. The separated sulfur may be conducted to a washer 62 to remove any water soluble impurities and one third of the sulfur is conducted through a line 64 to a sulfur combustion unit 66 for oxidation back to $SO_2$ gas. The remaining two thirds of the sulfur is removed for use as a commercial product.

Figure 3:
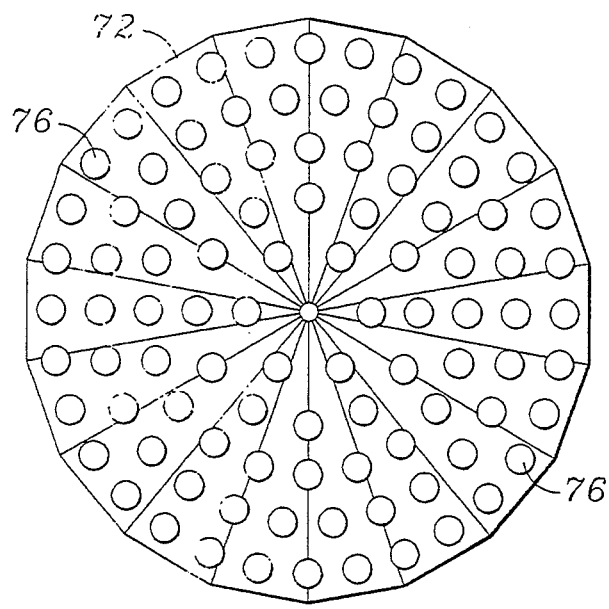
FIG. 3 is a front view of the helix used in the sulfur combustion chamber of FIG. 2.

The sulfur combustion unit 66 consists of a housing 68 provided with an inlet port (not shown) for receiving the sulfur from the line 64 and an inlet port (not shown) for the intake of air through a line 70. A rotating screw feeder 72 is disposed in the housing 68 and is driven by a motor 74 for moving the sulfur through the housing. The screw feeder is a helix which is provided with a multiplicity of holes 76 (FIG. 3). Temperature inside the housing 68 is kept under 500° C. The solid sulfur is fed through the line 64 into the housing 68 and is moved forward by the rotating screw feeder 72. As the sulfur solids move through the housing 68 they melt and the molten sulfur is picked up by the openings 76 on the screw helix. Air moving through the housing passes through the openings 76 and oxidizes the molten sulfur to sulfurous gas which exits the combustion unit 66 through a line 78 to the extraction section 12 of the column 10 for solubilization in the absorbent composition.

It will be understood that in addition to the oxidation of sulfur to sulfur dioxide to form makeup sulfur dioxide for the absorbent composition, gases which are carrying $SO_2$ also can be used for this purpose. Consequently, flue gases containing $SO_2$ may be led directly to the extraction section 12 of the column 10 where the $SO_2$ is solubilized in the absorbent composition. Likewise, "sweet gas" that is gas which has already been processed to remove the $H_2S$ but which still contains excess sulfur dioxide may also be used in lieu of the flue gas. However, it is preferred not to feed such gases directly into the column 10 for several reasons. First of all, flue gas after passing through the column and having its $SO_2$ dissolved in the absorbent composition must still be processed to remove $H_2S$ and/or other noxious gases before it can be vented to the atmosphere. In addition, both flue gas and processed "sweet gas" contain inert gases which interfere with the reaction. These inert gases comprise primarily nitrogen and oxygen and it is highly preferred that they not be introduced into the column 10, particularly when the treated gas is to be used in a downstream operation such as thermal cracking.

Figure 4:
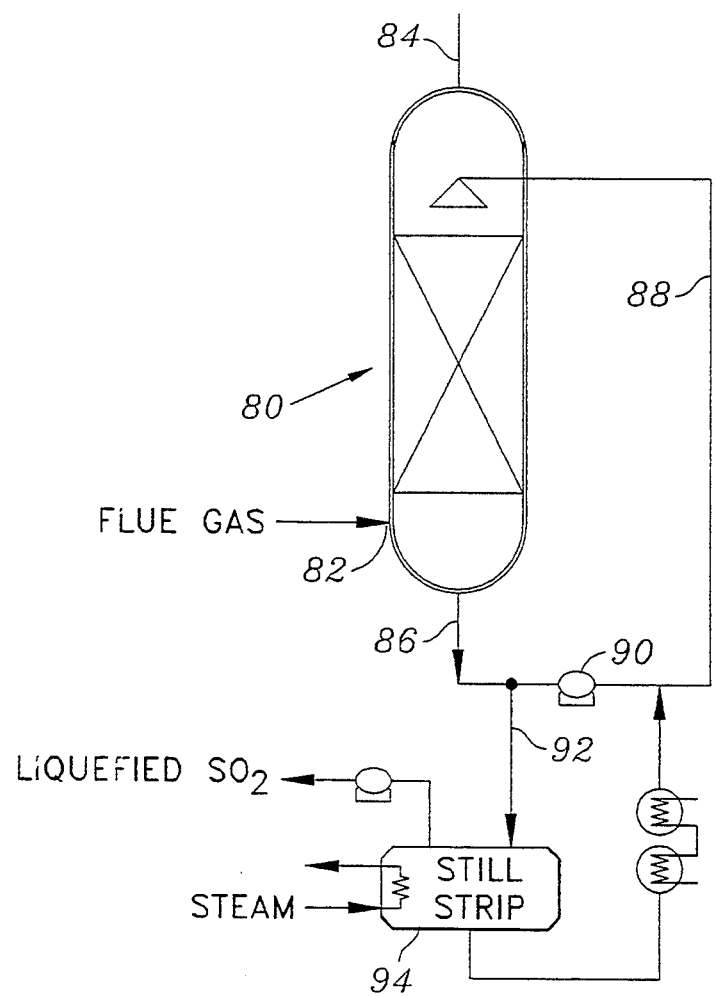
FIG. 4 is a schematic diagram of apparatus for using flue gas as a source of make up sulfur dioxide.

As is most clearly shown in FIG. 4, extraction of sulfur dioxide from a gas is carried out in a stripping column 80 which has an inlet 82 at its lower end for receiving a sulfur dioxide containing gas, such as for example flue gas, and a gas outlet 84 at its upper end. An absorbent composition of the type already described is circulated through the stripping column 80 through a line 86 and inlet line 88 by a motor 90. Portions of the circulating absorbent composition are removed by line 92 and a portion of the liquid is transferred to line 56 (FIG. 2) to provide make-up $SO_2$. The excess absorption composition not required for the production of make-up $SO_2$ is directed to a steam distillation unit 94 where the $SO_2$ is stripped from the absorbent composition and liquified and stored for future use in the process. The absorbent composition is passed from the steam distillation unit 94 back to the line 88 for recirculation through the stripping column 80. It will be understood that the interior of the stripping column 80 may be pressurized so that the $SO_2$ and absorbent composition are under pressure. The $SO_2$ can be stripped from the absorbent composition by reducing the pressure of the absorbent composition.

The following examples demonstrate several preferred ways for carrying out the method of the present invention, however, they should not be construed as limiting the invention as claimed herein.

EXAMPLE 1.

The following example demonstrates removal of $H_2S$ at ambient operating pressure using the method of the invention.

A steel column 150 mm in diameter was used as the reaction column. Seven packing stages of 1.0 m in height were installed in the column. Makeup $SO_2$ was prepared by oxidizing sulfur in air and the $SO_2$ was stored in a reservoir. $H_2S$ gas was caused to flow through the column at the rate of 0.95 nm$^3$/min. The absorbent composition was circulated through the reaction column at the rate of 19.4 l/min with a average total quantity of the absorbent in the column at about 15 liters. The absorbent composition was comprised of the following solvent mixture:

Monothione—50%
Cyclohexylamine—30%
Triethylene glycol—10%
N,N-dimethylacetamide—10%.

The temperature of the absorbent composition was maintained at between about 80° C. and 98° C. The $H_2S$ content at the inlet and outlet of the reaction column was measured every one-half hour. The results over a two and one-half hour period, are set forth in Table 1 below.

TABLE 1

| $H_2S$ INLET % | $H_2S$ OUTLET in ppm | $H_2S$ ABSORPTION % |
|---|---|---|
| 8.16 | 138.98 | 99.83 |
| 8.16 | 89.95 | 98.89 |
| 8.16 | 196.19 | 99.76 |
| 8.16 | 103.55 | 99.87 |
| 8.16 | 110.92 | 99.86 |

EXAMPLE 2

The following example demonstrates removal of $H_2S$ from a gas that is pressurized.

Gas containing hydrogen sulfide was maintained under a pressure of 10 atm and introduced to the reaction column as described in Example 1. Makeup $SO_2$ was prepared by oxidizing sulfur in air and the $SO_2$ was stored in a reservoir and fed through the foul gas inlet line into the reaction column at the rate of 77.65 gmol/min. The absorbent composition was circulated through the reaction column at the rate of 20.3 l/min and the quantity of the absorbent in the reaction column was maintained at 150 liters. The absorbent was heated prior to a temperature of 129° C. prior to entering the reaction column. The flow rate of the incoming pressurized gas was 10.49 nm$^3$/min. The absorbent contained the following solvent mixture:

1,3-propanesulfone—30%
quinoline—30%
N,N-diethylacetamide—10%
2-ethoxyethanol—20%
2,2-aminodiethanol—10%

The $H_2S$ content of the gas was measured at the inlet and at the outlet of the reaction column and measurements were taken every 30 minutes. The results for a 150 minute period of operation are set forth in Table 2 below.

TABLE 2

| $H_2S$ inlet % (under pressure | $H_2S$ OUTLET ppm | $H_2S$ % ABSORPTION |
|---|---|---|
| 33.14 | 894.78 | 99.73 |
| 33.14 | 4308.20 | 98.70 |
| 33.14 | 762.22 | 99.77 |
| 33.14 | 1325.60 | 99.60 |
| 33.14 | 762.22 | 99.77 |

Elemental sulfur was recovered from the absorbent solvent in a molten condition by periodically diverting a portion of the circulating absorbent solvent into a separation tank and heating the solvent in excess of 113° C. and maintaining it at or above that temperature for sufficient period to permit the colloidal sulfur particles in the absorbent solvent to melt. The molten sulfur was collected in the bottom of the vessel and removed therefrom and the absorbent composition from which the sulfur had been removed was reintroduced to the process.

EXAMPLE 3

To demonstrate the capability of the absorbent solvent to remove $SO_2$ from a gas, a gas containing $SO_2$ maintained at a pressure of less than 8 atmospheres was circulated through the reaction column of Example 1. The flow rate of the gas was 5.72 nm$^3$ and the flow rate of the absorbent solvent through the column was 20.3 l/min. The following absorbent solvent mixture was utilized (percent by volume).

4methyl 1,2dithiol-3 thion—45%
pyrodine—10%
diethylformamide—10%
diethanol amine—10%
methyl carbamate—7.2%
ethyl carbamate—7.8%

Measurement of the concentration of $SO_2$ in the gas at the inlet and at the outlet of the reaction column were taken every 30 minutes. The results are set forth in Table 3 below.

TABLE 3

| $SO_2$ inlet ppm | $SO_2$ Outlet ppm | $SO_2$ Absorption % |
|---|---|---|
| 1497 | 11.80 | 99.21 |
| 1497 | 20.90 | 98.60 |
| 1497 | 9.73 | 99.35 |
| 1497 | 8.81 | 99.41 |
| 1497 | 2.67 | 99.82 |
| 1497 | 5.33 | 99.64 |
| 1497 | 5.19 | 99.65 |

EXAMPLE 4

The pressure in the column of Example 3 was raised to 15 atm and the flow rate for the $SO_2$ containing gas was reduced to 10.18 nm$^3$/min. Flow rate for the absorbent solvent was 23.0 l/m and the following solvent mixture was employed:

1,2dithiol-3 ON—40%
2(2-ethoxy)ethanol—10%
cyclohexylamine—10%
N,N-diethanolamine—10%
N,N-dimethylacetamide—20%
methyl carbamate—4.8%
ethyl carbamate—5.2%

Measurements of the $SO_2$ content of the gas were made every 30 minutes at the inlet and at the outlet of the reaction column.

TABLE 4

| | (sampled every 30 min.) | |
|---|---|---|
| $SO_2$ inlet ppm | $SO_2$ Outlet ppm | $SO_2$ Absorption% |
| 1497 | 5.21 | 99.65 |
| 1497 | 5.37 | 99.64 |
| 1497 | 3.84 | 99.74 |
| 1497 | 3.39 | 99.77 |
| 1497 | 5.33 | 99.79 |
| 1497 | 5.19 | 99.64 |

From the forgoing it can be seen that the method of the present invention removes a major portion of H$_2$S from gases under a variety of operating conditions. The remaining minor proportions of H$_2$S or subsequently removed by conventional catalytic scrubbing processes. Since only minor portions of H$_2$S are treated with the catalyst solution the consumption of catalyst due to entrainment with the sulfur is very small since very small quantities of catalyst are required. Accordingly the cost of desufurizing a gas is substantially reduced. It can also be seen that the method of the invention is effective for the removal of SO$_2$ from a gas. Indeed the presence of SO$_2$ in the gas being treated is beneficial since, in accordance with the invention, the SO$_2$ can be used as a source of make up SO$_2$ for the absorbent composition for use in the process. The overall effect is to further reduce the cost of desulfurizing a gas by providing an inexpensive source of reactant for the process.

As will be understood by those skilled in the art, various arrangements other than those described in detail in the specification will occur to those persons skilled in the art which arrangements lie within the spirit and scope of the invention. It is therefor to be understood that the invention is to be limited only by the claims appended hereto.

Having described the invention, we claim:

1. A method for the removal of sulfur compounds from a gas comprising the steps of:
   a. forming an absorbent composition comprising solubilized sulfur dioxide in at least the stoichiometric concentration to react with a major portion of hydrogen sulfide present in said gas being treated and a non-aqueous solvent therefor;
   b. contacting said gas being treated with said absorbent composition and maintaining said contact for sufficient period to absorb a major portion of hydrogen sulfide in said gas by reaction with said solubilized SO$_2$ to form water and elemental sulfur as byproducts thereof; and
   c. thereafter, contacting said treated gas with a catalyst to convert the hydrogen sulfide in said gas to elemental sulfur.

2. The method of claim 1 further including the step of recovering elemental sulfur from said absorbent composition after contact with said gas.

3. The method of claim 2 wherein said absorbent composition is heated to a temperature above the melting point of elemental sulfur and then cooled thereby to precipitate particles of elemental sulfur from said absorbent composition.

4. The method of claim 3 wherein said cooled absorbent composition is filtered to separate said elemental sulfur therefrom.

5. The method of claim 3 wherein said elemental sulfur is separated from said absorbent composition by centrifugation.

6. The method of claim 2 further including the step of adding sulfur dioxide to said absorbent composition during said contact step thereby to replace reacted SO$_2$ to maintain the stoichiometric amount of SO$_2$ required to react with said hydrogen sulfide in said gas being treated.

7. The method of claim 6 wherein said sulfur dioxide is added concurrently with said incoming gas being treated.

8. The method of claim 6 wherein said SO$_2$ is prepared by oxidizing elemental sulfur.

9. The method of claim 6 wherein said sulfur dioxide is prepared by heating elemental sulfur above its melting point and below about 500° C. in the presence of air.

10. The method of claim 6 wherein said SO$_2$ is obtained by contacting a gas containing SO$_2$ with said absorbent composition thereby to solubilize said SO$_2$ content of said gas therein.

11. The method of claim 10 wherein the contact between said SO$_2$ containing gas and said absorbent composition is carried out in a reactor separate from the contact between the absorbent composition and said gas being treated and the SO$_2$ solubilized from said SO$_2$ containing gas is separated from the absorbent composition prior to contact with said gas being treated thereby to avoid the introduction of oxygen and nitrogen to said gas being treated.

12. The method of claim 1 wherein said contact between said absorbent composition and said gas being treated is carried out at ambient pressure and at a temperature of between about 30° C. and about 90° C.

13. The method of claim 1 wherein contact between said absorbent composition and said gas being treated is carried out at an elevated pressure and at a temperature of about 130° C.

14. The method of claim 1 wherein said absorbent composition comprises an organic solvent for SO$_2$ capable of being heated above the melting point of elemental sulfur.

15. The method of claim 1 wherein said absorbent composition comprises a solvent admixture consisting of 40% by volume of tetra methylene sulfone and 60% by volume of a composition selected from the group consisting of pyridine and quinoline and mixtures thereof.

16. The method of claim 1 wherein said solvent comprises 50 volume percent of a mixture of monothione, 30 volume percent cyclohexylamine, 10 volume percent triethylene glycol and 10 volume percent N,N-dimethylacetamide.

17. The method of claim 1 wherein said solvent comprises 30 volume percent, 1,3-propane sulfone, 30 volume percent quinoline, 10 volume percent N,N-diethyl acetamide, 20 volume percent 2-ethoxyethanol and 10 volume percent 2,2-aminodiethanol.

* * * * *